United States Patent [19]

Satterwhite

[11] Patent Number: 4,489,959
[45] Date of Patent: Dec. 25, 1984

[54] UNDERWATER CONNECTOR

[76] Inventor: Lawrence E. Satterwhite, 101 Butlers Ct., Conroe, Tex. 77302

[21] Appl. No.: 360,161

[22] Filed: Mar. 22, 1982

[51] Int. Cl.³ .................. F16L 55/00; F16L 25/00; F16L 5/00
[52] U.S. Cl. .................. 285/18; 285/9 R; 285/196; 285/348; 285/DIG. 21
[58] Field of Search ......... 285/18, 9 R, 348, DIG. 21, 285/196

[56] References Cited

U.S. PATENT DOCUMENTS

| | | |
|---|---|---|
| 3,427,048 | 2/1969 | Brown . |
| 3,494,638 | 2/1970 | Todd et al. ............. 285/348 X |
| 3,701,549 | 10/1972 | Koomey et al. . |
| 3,817,281 | 6/1974 | Lewis et al. . |
| 3,840,071 | 10/1974 | Baugh et al. . |
| 3,966,235 | 6/1976 | Lewis . |
| 4,219,223 | 8/1980 | Schulte . |

Primary Examiner—Richard J. Scanlan, Jr.
Attorney, Agent, or Firm—Ben D. Tobor

[57] ABSTRACT

An underwater hydraulic connector utilizing a cylindrical male portion inserted into a cavity in a female portion. The male portion consists of a telescoping inner and outer housing with a plurality of resilient seals mounted within openings in the outer housing whereby if the seals are compressed they will extrude beyond the surface of the male portion and contact the interior surface of a female portion so as to provide a sealed passageway between a set of ports in the male and female portions. The extrusion of the seal is accomplished by means of a bar which compresses the seal when moved longitudinally with respect to the outer housing. The bar is mounted on the inner housing. Relative movement of the inner housing and bar with respect to the outer housing is controlled by means of a piston and cylinder assembly and compression of the resilient seals is assisted by the external water pressure acting upon the inner housing to force it into the outer housing.

9 Claims, 5 Drawing Figures

UNDERWATER CONNECTOR

1. Field of the Invention

The invention relates to an underwater connector device for connecting fluid and hydraulic conduits, particularly for oil and gas drilling and production operations.

2. Description of the Prior Art

Operations performed in underwater and remote locations, such as beneath offshore drilling production platforms or ships, frequently utilize hydraulically actuated equipment located at or near the top of the wellbore, such as blowout preventors for controlling the outflow of hydrocarbons. Periodically it is necessary to disconnect the control lines from the equipment so that the remote control apparatus mounted on a ship or platform may be moved. Movement of the control apparatus may be necessitated by the presence of inclement weather, or the desirability of moving the apparatus to another drilling site. Sending divers to the wellbore to accomplish the connection or disconnection is not only expensive, but also dangerous in view of the increased depth at which hydrocarbon exploration is currently being conducted.

Devices have been constructed to facilitate the remote connection and disconnection of the control lines to the hydraulic equipment. U.S. Pat. No. 3,701,549, issued to Koomey et al, discloses a connector having a female portion permanently attached above the wellbore and connected hydraulically to the equipment, and a male portion which may be lowered and guided into engagement with the female portion. The interface surfaces or contact surfaces between the male and female portions have a generally tapered or conical shape. A plurality of hydraulic lines have ports located on each contact surface. Each port on the male portion of the connector has a concentric resilient ring mounted around it, which in an undeformed state protrudes beyond the contact surface. The rings are compressed by the contact of the male with the female portion, sealing the juncture of the ports. This connector has a disadvantage in that the machining of conical surfaces is expensive and difficult for extremely close tolerances must be maintained. Any eccentricity or deformation of the surface will adversely affect the integrity of the seal between the ports. Furthermore, an expensive and complex latching mechanism is required to maintain the ports in accurate alignment. Additionally, it is believed that there is a tendency for the rubber seals to blow outwardly upon disengagement of the contact surfaces, since there is no space to allow the release of the pressure forces within the hydraulic lines.

U.S. Pat. Nos. 3,817,281, and 3,966,235, issued to Lewis et al, disclose an attempt to overcome the expense of the conical shape of Koomey et al by providing mating obliquely oriented planar surfaces for mounting of the aligned hydraulic ports. This approach is only partially effective in reducing the expense and complexity of the conical design and still requires extremely close tolerances to accurately align each set of ports and maintain the integrity of the seal. Further, both Koomey et al and Lewis et al teach the use of deformable pads or rings which are compressed by a sliding motion between the male and female contact surfaces. This motion places an extremely high shear stress on the pad. Since the male and female surfaces are in full contact with each other, disconnection of the male from the female portion requires an upward movement which causes excessive surface-to-surface friction. This friction thus increases the force required, and maximizes the pad wear, to disconnect the male from the female portion. The connectors disclosed in U.S. Pat. No. 4,219,223, issued to Schulte and U.S. Pat. No. 3,840,071, issued to Baugh et al also have structures which require sliding motion, and this resultant pad wear, in order to connect and disconnect the fluid passageways.

U.S. Pat. No. 3,427,048, issued to Brown, discloses a device which eliminates the slanted or conical contact surfaces of Koomey et al and Lewis et al by providing a connector with cylindrical male and female portions. However, Brown requires the use of a complex, mechanically powered mechanism for forcing the male portion against the female portion and relies on a metal-to-metal surface contact to seal the juncture of each set of hydraulic ports.

Accordingly, prior to the development of the present invention, there has been no underwater connector which: is simple in its manufacture and use; provides a positive seal for fluid control lines; does not place a shearing frictional force on the seal members; and does not require tapered or conical contact surfaces. Therefore, the art has sought an underwater connector which: is simple and economical to manufacture and use; provides a positive and leakproof connection between two control lines; minimizes frictional shearing forces on the sealing members; and does not require tapered or conical shaped contact surfaces.

SUMMARY OF THE INVENTION

In accordance with the invention the foregoing has been achieved through the present underwater connector. The present invention includes: a hollow first body including at least one first conduit for the passage of a fluid therethrough, and having an end thereof communicating with the interior of the first body; a second body which fits within the first body and includes at least one second conduit for the passage of a fluid therethrough, and having an end thereof communicating with the exterior surface of the second body; at least one deformable sealing means mounted within the second body and disposed about the end of the second conduit, the sealing means being disposed in a first position spaced from the interior surface of the first body and aligned with the end of the first conduit in the first body; compression means for deforming the sealing means, whereby the sealing means is forced outwardly to a second position in contact with the interior surface of the first body to provide a sealed passageway for the passage of fluid between the first and second conduits; and means for selectively actuating the compression means.

Another feature of the present invention is that the sealing means comprises at least one resilient insert having an opening therethrough encircling the end of the second conduit, the sealing means being mounted within an opening in the second body.

A further feature of the invention resides in the fact that the compression means is a bar member slidably mounted within the second body for selective longitudinal movement toward and away from the sealing means. Another feature of the present invention is that the means for actuating the compression means includes a third body telescopically mounted within the second body; and the compression means is secured to the third body, whereby upon relative longitudinal movement of the third body with respect to the second body, the compression means contacts and deforms the sealing means.

A further feature of the present invention resides in the fact that there is at least one force receiving and transmitting surface associated with each of the second and third bodies for receiving and transmitting external underwater pressure forces to the compression means.

The underwater connector of the present invention, when compared with previously proposed prior art underwater connectors, has the advantages of simplicity in manufacture and use, is economical to manufacture, provides a fluid-tight seal between the fluid control lines, does not require shearing frictional forces in use, and does not require tapered or conically shaped contact surfaces.

While the invention will be described in connection with the preferred embodiment, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

Figure 1:
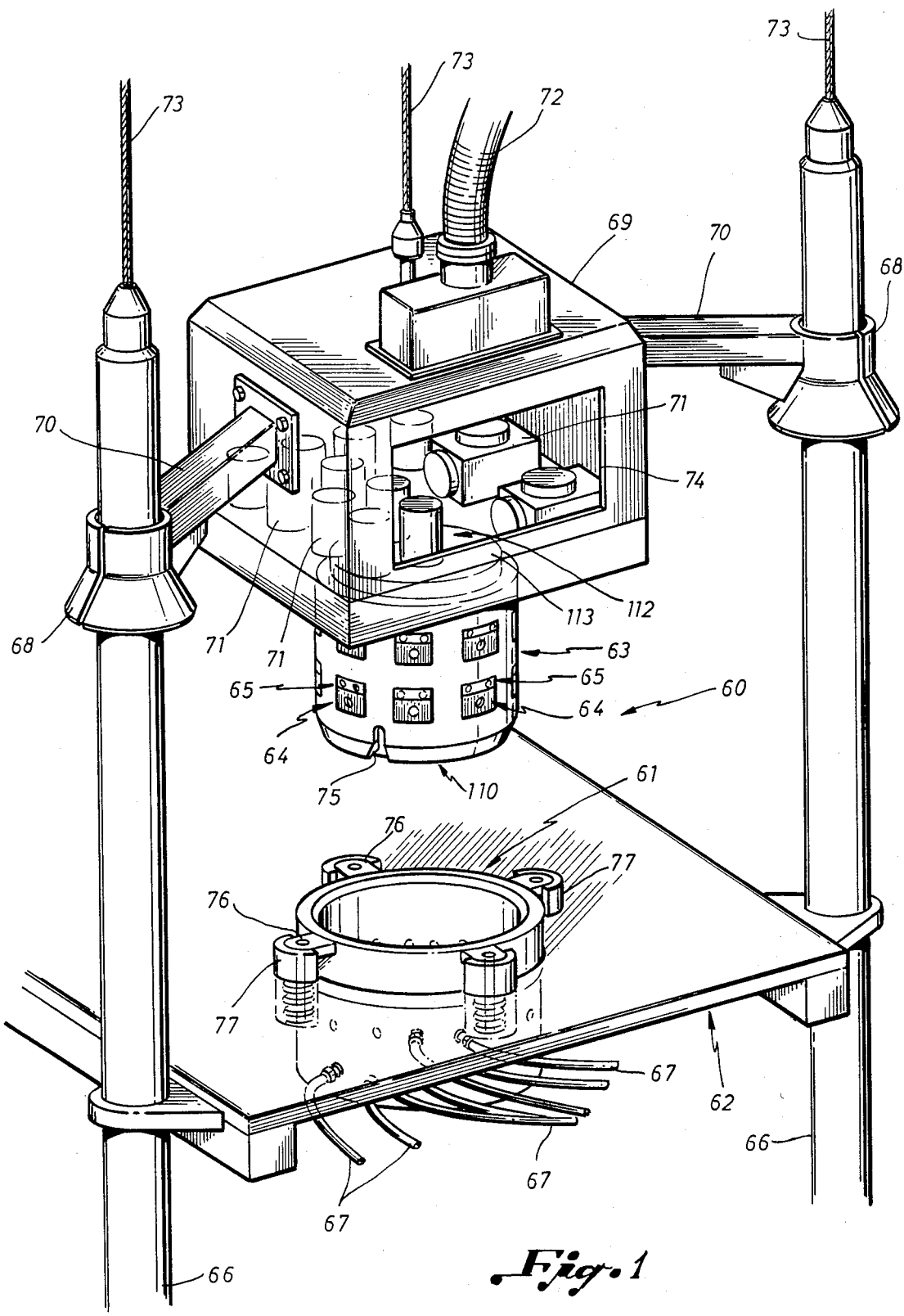
FIG. 1 is a perspective elevation of an underwater connector in accordance with the present invention.

In FIG. 1, an underwater connector 60 in accordance with the present invention is shown to generally comprise: a hollow first body 61 mounted on an underwater platform 62; a second body 63 which fits within the first body 61; at least one deformable sealing means 64 mounted within the second body 63; compression means 65 for deforming the sealing means 64; and a means for selectively actuating the compression means, which will be hereinafter described. The platform 62 and hollow first body 61 will be normally mounted on the sea bed (not shown) above a conventional wellbore (not shown). The platform 62 may be mounted upon a plurality of substantially vertical supports 66, fixedly secured to the sea bed. A plurality of hydraulic lines 67 connect the hollow first body 61 to a plurality of various conventional hydraulically actuated devices, such as blowout preventors (not shown) contained in or near the wellbore, so as to control the outflow of hydrocarbons.

Still with reference to FIG. 1, it is seen that a plurality of guides 68 are connected to a control housing 69 by a plurality of support arms 70. Although not shown in FIG. 1, it is to be understood that there are four vertical supports 66 and a like number of guides 68 and support arms 70 associated with control housing 69. It should be readily apparent to those skilled in the art that as few as two vertical supports 66 and a corresponding number of guides 68 and support arms 70 could be utilized with the underwater connector 60 of the present invention.

The second body 63 is associated with control housing 69, and is preferably mounted underneath control housing 69 in any suitable manner. The control housing 69 may include a plurality of relays 71, or similar devices, which may be used to control the flow of pressurized hydraulic fluid through conventional hydraulic lines. The activity of the relays 71 is controlled by a plurality of control lines contained within a hydraulic umbilical hose 72 which pass from the relays 71 and control housing 69 to conventional control equipment disposed at the surface, such as upon an offshore platform or boat. There are a plurality of guidelines 73 associated with each of the vertical supports 66, so that the control housing 69 may be lowered by wireline (not shown) in a conventional manner. Control housing 69 has a plurality of openings therein, such as is shown at 74, whereby sea water may enter the interior of control housing 69, the purpose of which will be hereinafter described. As seen in FIG. 1, the second body 63 has a keyway 75 at its lower end, which keyway 75 flares outwardly for engagement with a key, as will be hereinafter described with regard to FIGS. 2 and 3.

Figure 2:
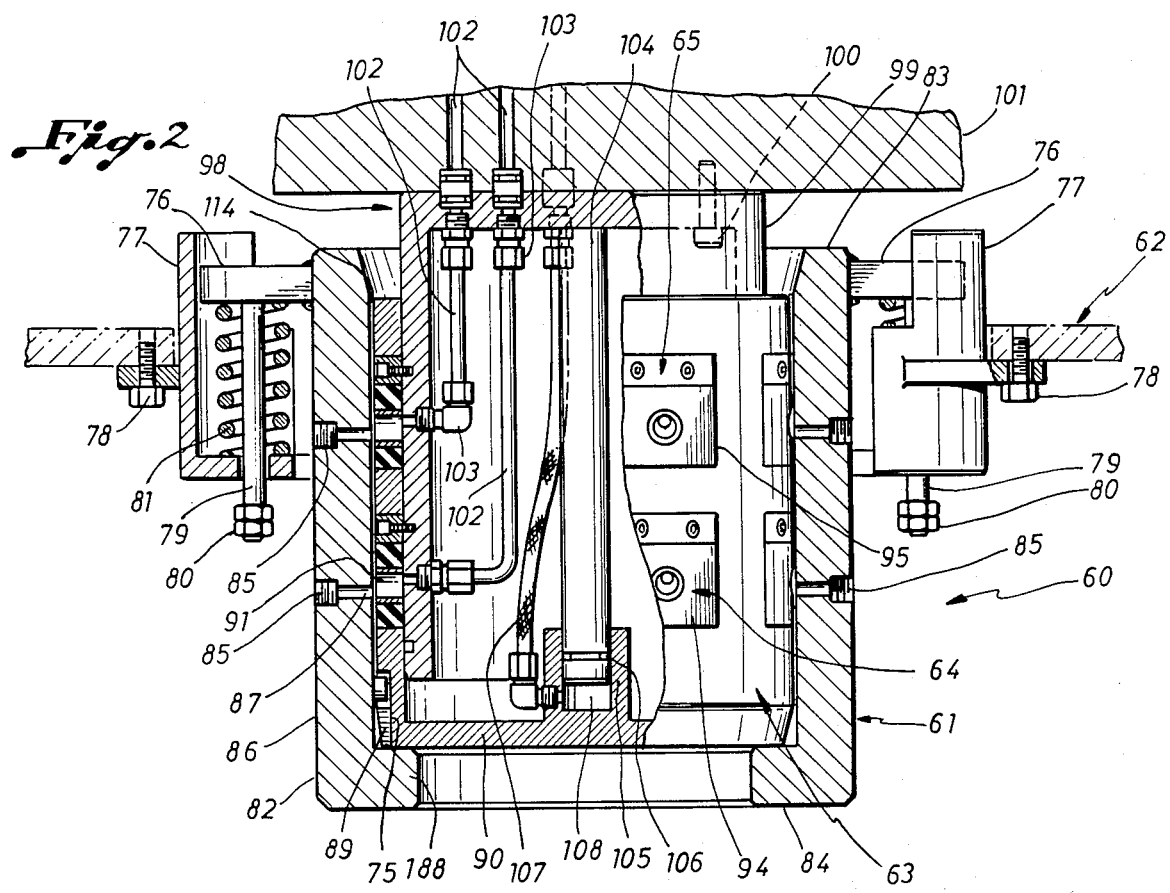
FIG. 2 is a cross-sectional view of the connector of the present invention taken along the longitudinal axis of the connector in FIG. 1 showing the sealing means in a disengaged position.
Figure 3:
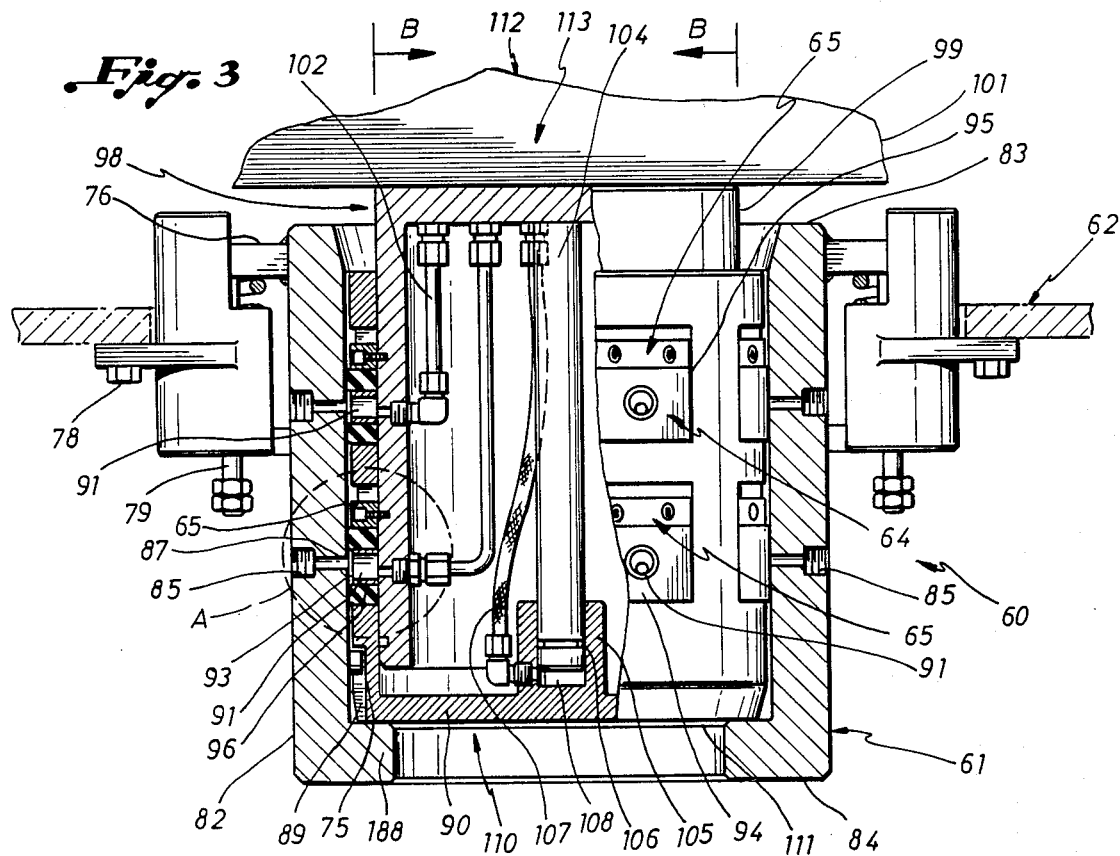
FIG. 3 is a cross-sectional view of the connector of the present invention taken along the longitudinal axis of the connector in FIG. 1, showing the sealing means in an engaged mode.

Turning now to FIGS. 1, 2 and 3, the underwater connector 60 of the present invention will be described in greater detail. As seen generally in FIG. 1 and in detail in FIGS. 2 and 3, a plurality of outwardly extending flanges 76 are secured to the first hollow body 61 as by welding. Flanges 76 are received within housings 77 secured to the platform 62 as by bolts 78. There are threaded shafts 79 downwardly depending from flanges 76 with locknuts 80 mounted thereon, and springs 81 are disposed about shafts 79 between flanges 76 and the bottom of housing 77. Thus, springs 81 provide a shock absorbing mounting for the first hollow body 61 to platform 62. Of course, any other suitable shock absorber device could be used to mount the first hollow body 61 to platform 62, whereby a limited amount of vertical movement between the first hollow body 61 and platform 62 may be obtained and thus provide a limited amount of flexibility and resiliency.

With reference to FIGS. 2 and 3, it is seen that the first hollow body 61 generally comprises a tubular shaped female member 82 which is open at its upper and lower ends 83 and 84. The first hollow body 61 includes at least one first conduit 85 for the passage of a fluid, such as hydraulic fluid, through first conduit 85. Hydraulic lines 67, as seen in FIG. 1, are connected to the outer surface 86 of the first hollow body 61 in fluid transmitting relationship to the first conduit 85. As shown in FIGS. 2 and 3, a plurality of first conduits 85 are disposed along the length and about the periphery of the tubular shaped female member 82. An end 87 of first conduit 85 is in communication with the interior surface 88 of the first hollow body 61. At the lower end 84 of the first hollow body 61, there is disposed an annular flange 188 which provides a stop means to prevent the passage of the second body 63 completely through the first hollow body 61 upon the lowering of control housing 69 as will be hereinafter described. Any suitable stop means may be utilized, such as the interior flange 188, an interior annular ring, or any member which makes point contact with the second body 63 as will be readily understood by anyone skilled in the art. First hollow body 61 also includes a key 89 which mates with the keyway 75 disposed on the second body 63, whereby key 89 and keyway 75 serve the purpose of accurately aligning the second body 63 within the first hollow body 61 as control housing 69 and second body 63 are lowered downwardly, whereby second body 63 mates within the first hollow body 61.

Figure 4:
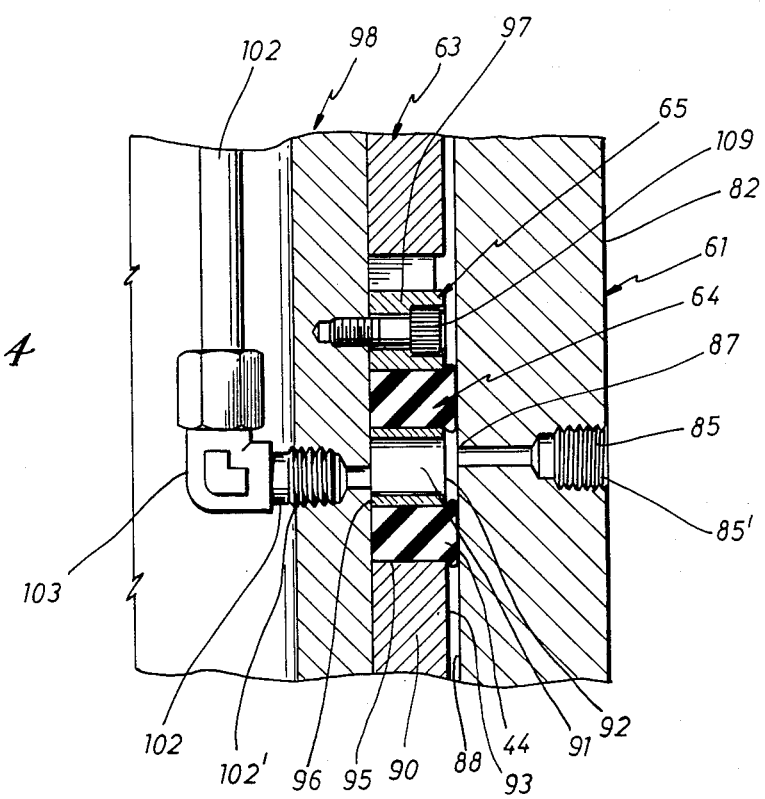
FIG. 4 is an exploded cross-sectional view of a mirror image of the hydraulic port of the present invention encircled at A in FIG. 3.

Still with reference to FIGS. 2 and 3, it is seen that second body 63 is comprised of a generally tubular shaped cup-like member 90 having a generally U-shaped configuration. Second body preferably has a chamfered surface at its lower end to facilitate the insertion of second body 63 into first hollow body 61. With reference to FIGS. 2, 3 and 4, it is seen that cup-shaped member 90 of second body 63 has at least one second conduit 91 for the passage of a fluid, such as hydraulic fluid, through the second body 63, and the second conduit 91 has one of its ends 92 communicating with the exterior surface 93 of the second body 63. It should be noted that the exploded view of FIG. 4 of portion A of FIG. 3 is shown as a mirror image of the circled portion A in FIG. 3. As shown in FIG. 3, there are a plurality of second conduits 91 shown disposed within the outer surface 93 of the second body 63. The number of second conduits 91 corresponds to the number of first conduits 85 in the hollow first body 61.

Figure 5:
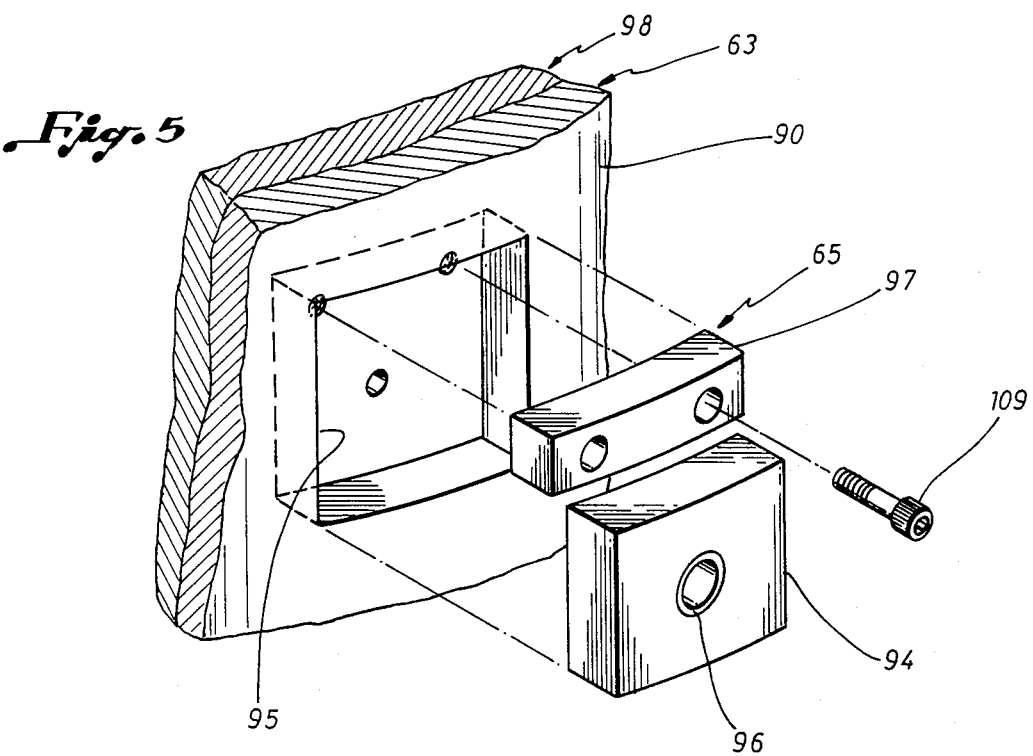
FIG. 5 is a perspective view of the assembly of a hydraulic port in accordance with the present invention.

As seen in FIGS. 2, 3 and 4, at least one deformable sealing means 64 is mounted within the second body 63 and is disposed about the end 92 of the second conduit 91. As seen in FIGS. 2 and 3, a deformable sealing means 64 is provided for each second conduit 91. Preferably, the sealing means 64 comprises a resilient insert 94 having an opening therethrough which encircles the end 92 of second conduit 91. The insert 94 is mounted within a mating sized opening 95 formed in second body 63. Although resilient insert 94 is shown in FIGS. 4 and 5 to have a generally rectangular shape, it should of course be readily understood to those skilled in the art that resilient insert 94 could have other shapes, i.e., square or hexogonal shaped, with opening 95 having a corresponding shape thereto. Likewise, it should be readily apparent to those skilled in the art that although the hollow first body 61 is shown to have a generally tubular shape, it could have any other shape, such as square, rectangular, or hexogonal, etc., so long as the second body 63, which fits within first hollow body 61 has a corresponding shape. The resilient insert 94 may be made of any suitable elastomer which is compatible with the hydraulic fluid and sea water with which it will come in contact. The elastomer material must also be resilient and have a memory, whereby upon the release of a deforming force placed upon the insert, it will resume its previous undeformed condition. Various types of rubber and polyurethane elastomers are suitable for use as the resilient insert 94, but of course it should be understood that any material having the foregoing described characteristics may be used for resilient inserts 94.

Preferably, as shown in FIGS. 3 and 4, a metallic port liner 96 is provided within second conduit 91 to help maintain the shape of conduit 91. In its undeformed condition, resilient insert 94 is disposed within second body 63 with its outer surface flush with the outer surface of second body 63 as shown in FIG. 2. Resilient insert 94 may be flexibly secured within second body 63 in any conventional manner, such as by epoxy bonding along its outer periphery surfaces which do not contact compression means 65, or by screws, etc.

With reference now to FIGS. 3, 4 and 5, it is seen that the second body 63 is provided with a compresssion means 65 for deforming the sealing means 64 in order to provide a sealed passageway for the passage of fluid between the first and second conduits 91 and 85. Compression means 65 may preferably be a bar member 97 slidably mounted within the second body 63 for selective longitudinal movement toward and away from the sealing means 64, or resilient insert 94. Preferably, as seen in FIGS. 1–3, a compression means 65, or bar member 97, is associated with each deformed sealing means 64, or resilient insert 94. As shown in FIGS. 4 and 5, bar member 97 is preferably disposed above resilient insert 94 within opening 95 formed within second member 63, or tubular cup-shaped member 90.

The underwater connector 60 of the present invention is also provided with a means for selectively actuating the compression means 65. With reference to FIGS. 2 and 3, it is seen that the means for actuating the compression means 65 includes a third body 98 telescopically mounted within the second body 63. Preferably, the third body 98 is an inverted cup-like tubular housing 99 having a general U-shaped configuration. The third body 98 is secured, as by bolts 100 to a mounting plate 101 attached to control housing 69. A plurality of hydraulic lines 102, and suitable connections 103, pass from relays 71 in control housing 69 (FIG. 1) and through mounting plate 101 to the interior of the third body 98. As seen in FIGS. 2 and 3, the hydraulic lines 102 are in fluid transmitting relationship to the second conduits 91, as is more clearly shown in FIG. 4.

Relative movement of the third body 98 with respect to the second body 63 may be controlled by a hydraulic piston 104 and cylinder 105 which are operatively associated with the second and third bodies 63 and 98. As seen in FIGS. 2 and 3, the hydraulic piston 104 is preferably secured within the third body 98 at its upper end, and the hydraulic cylinder 105 is formed within the lower end of second body 63. As is conventional in the art, an O-ring 106 is provided on the piston 104 in a sealing relationship with the interior surface of cylinder 105. A hydraulic line 107, or vent line, is associated with the cylinder 105 whereby a quantity of pressurized fluid, such as hydraulic fluid 108, may selectively enter cylinder 105, or be vented therefrom, via a suitable pump disposed either within control housing 69 or at the surface of the ocean, such as on an offshore platform or a ship. As is readily apparent, upon hydraulic fluid 108 entering cylinder 105, the third body 98 will be forced outwardly from second body 63, and thus an upward longitudinal movement between bodies 63 and 98 will occur. As will be hereinafter described with respect to the operation of the underwater connector 60 of the present invention, upon the hydraulic fluid 108 being vented out of cylinder 105 and through hydraulic line 107, external underwater pressure forces will act upon second and third bodies 63 and 98 and will force them to move toward one another. This occurs because the external underwater forces will exceed the prior internal pressure forces which had been contained within cylinder 105, which were released upon venting of the fluid through line 107. As will be readily apparent to one skilled in the art, the location of the piston and cylinder 104 and 105 could be modified, whereby piston 104 is secured to the second body 63 and the cylinder 105 could be secured to the third body 98. Additionally, it should also be readily apparent to one skilled in the art that other devices could be utilized to develop relative longitudinal movement between second and third bodies 63 and 98 to thus actuate compression means 65. Such devices include the use of a hydraulic motor, mechanical motor, electrical motor, a double acting hydraulic cylinder, etc., which could be disposed within third body 98 or in control housing 69.

With reference to FIGS. 4 and 5, it is seen that compression means 65, or bar member 97, is preferably secured to the third body 98 as by bolts 109, and the opening 95 formed within second body 63 conforms to the sides of resilient insert 94 (in its undeformed state) and bar member 97. Thus, upon release of the hydraulic fluid within cylinder 105, as previously described, there will be relative longitudinal movement with respect to second and third bodies 63 and 98. With reference to FIG. 4, it will be understood that as third body 98 moves downwardly and telescopes within second body 63, bar member 97 will likewise slide downwardly within opening 95 and deform resilient member 94 as shown in FIG. 4. As is seen in FIG. 4, the outer surface of resilient member 94 will be extruded outwardly, whereby it contacts the interior surface of first hollow body 61 in a sealing relationship about the first end 87 of first conduit 85. Likewise, upon relative longitudinal movement between bodies 63 and 98 caused by the upward movement of third body 98 away from second body 63, the bar member 97 will move upwardly along with third body 98, thus releasing the compressional force exerted by bar member 97 upon resilient insert 94. When that compressional force is released, resilient insert 94 will assume its undeformed shape as shown in FIGS. 2 and 5, wherein the outer surface of resilient insert 94 will be in a spaced relationship from the interior surface of first hollow member 61.

It should be readily apparent to those skilled in the art that bar member 97 could be disposed beneath resilient insert 94 and still apply a compressional force to resilient insert 94. First hollow body 61 would remain stationary with respect to the third body 98, and the second body 63 would move upwardly, whereby bar member 97 would move upwardly to compress the resilient insert 94 disposed above it. Likewise, it should be readily apparent to those skilled in the art that the sealing means 64 could comprise a single resilient annular band disposed within the outer surface of second body 63, with compression means 65 comprising a single annular bar member secured to the third body 98 and disposed above the single resilient insert 94. It should also be noted that the underwater connector 60 of the present invention could be utilized to transmit electrical signals from the surface of the ocean to the wellbore. In that situation, conduits 85 and 102 would be electrical conductors and resilient insert 94 and port liner 96 could be manufactured of an inductive material whereby electrical signals could be transmitted from electrical conductor 85' to electrical conductor 102', as shown in FIG. 4, through insert 94 and port liner 96. Alternatively, resilient insert 94 could contain electrical conductors in electrical signal transmitting relationship to electrical conductor 102', whereby upon resilient insert 94 being deformed and contacting the interior surface of hollow first body 61, those electrical conductors would contact mating electrical conductors disposed on the interior surface of first hollow body 61.

Turning now to FIGS. 1 and 3, an additional portion of the means for actuating the compression means 65 will be described. Underwater connector 60 includes at least one force receiving and transmitting surface 110 associated with the second body 63 for transmitting external underwater pressure forces to the compression means 65, and thus constitutes a portion of the means for actuating the compression means 65. As shown in FIG. 3, the at least one force receiving and transmitting surface 110 comprises the bottom exterior surface 111 of the second body 63, or cup-shaped member 90. Because of the opening at the lower end 84 of first hollow body 61, the external underwater pressure forces are able to contact and be received by surface 110, which are in turn transmitted to compression means 65 as will be hereinafter described. Preferably, another force receiving and transmitting surface 112 is associated with the second body 63. This surface 112 is comprised of the circular shaped surface 113 disposed above mounting plate 101 and whose outer periphery is denoted with the arrows marked B as shown in FIG. 3. Because of the openings 74 formed in the control housing 69, sea water is disposed above surface 113 on mounting plate 101 and exerts a downward force upon the third body 98 which is in turn transmitted to compression means 65 via its connection to third body 98.

Thus, upon the venting of hydraulic fluid 108 from cylinder 105, the external underwater pressure forces of the sea act upon the force receiving and transmitting surfaces 111 and 113 to provide relative longitudinal movement of third body 98 toward second body 63, thus actuating compression means 65 to contact and deform sealing means 64. It should be understood that, when the underwater connector 60 of the present invention is utilized in shallow water, wherein the underwater pressure forces are not as great as when the connector 60 is utilized in deep water situations, the additional devices, previously described, could be utilized to develop and assist the relative longitudinal movement between second and third bodies 63 and 98 to thus actuate compression means 65. As previously described, such devices could include the use of a hydraulic motor, mechanical motor, electrical motor, a double-acting hydraulic cylinder, etc., which could be disposed within third body 98 or in control housing 69.

With reference to FIGS. 1, 2 and 3, the operation of the underwater connector 60 of the present invention will be described. When it is necessary to provide a fluid-tight connection between hydraulic lines 67 and the hydraulic lines contained within hydraulic umbilical cord 72, control housing 69 having the second and third bodies 63 and 98 supported therefrom, is lowered downwardly into the sea along guidelines 73 and further downwardly over support legs 66. Control housing 69 and second and third bodies 63 and 98 are then further lowered and stabbed into the first hollow body 61, until the second body 63 engages the stop means 188 disposed at the lower end 84 of the first hollow body 61. The stabbing operation is assisted by the guides 68 on control housing 69, as well as by the chamfered bottom surface of second body 63 and the key 89 within first body 61, and the keyway 75 formed in the exterior surface of second body 63. Thus, as seen in FIG. 2, the first and second conduits 85 and 91 of first and second bodies 61 and 63 are aligned with one another in an unsealed relationship with the deformable sealing means 64 being disposed in a first position spaced from the interior surface of the first body 61. During the stabbing operation, hydraulic fluid 108 is present within cylinder 105, which creates a force to restrain the relative longitudinal movement of third body 98 downwardly within second body 63. Thus, compression means 65 has not been actuated and sealing means 64 remains in an undeformed condition.

Upon the venting of hydraulic fluid 108 from cylinder 105, third body 98 telescopes downwardly within second body 63 thus actuating compression means 65 to contact and deform sealing means 64, as shown in FIGS. 3 and 4, whereby the resilient insert 94 has its outer surface extruded outwardly from opening 95 in second body 63 to contact the interior surface of first hollow body 61 to provide a sealed passageway between conduits 85, 91 and 102. The relative longitudinal movement of the third body 98 with respect to the second body 63 is caused by the weight of control housing 69, as well as is assisted by the external underwater pressure forces acting upon the force receiving and transmitting surfaces 110 and 112. As has been previously described, such longitudinal movement may also be provided by other devices to assist the movement of compression means 65 into contact with sealing means 64. Thus, compression means 64 has been forced outwardly to a second position in contact with the interior surface of the first body 61 to provide a sealed passageway for the passage of fluid between the first and second conduits 85 and 91.

In order to disengage the underwater connector 60 of the present invention, hydraulic fluid 108 is pumped into cylinder 105 which causes relative longitudinal movement of second body 98 outwardly and away from second body 63. That movement causes compression means 65 to move upwardly away from sealing means 64, whereby sealing means 64 assumes its previous undeformed configuration as shown in FIG. 2. Upon the sealing means 64 assuming its undeformed configuration, the pressurized fluid contained within hydraulic lines 102 and 67 is allowed to be released and escape through the annular space 114 disposed between bodies 61 and 63. The provision of annular space 114 provides an important advantage over prior art devices. Upon disengagement of their sealing means, there is no space provided to allow the release of the pressurized fluid. Therefore, there is a tendency in such prior art devices for the various types of seals to be blown out by the release of the pressure forces of the pressurized fluid.

After the underwater connector 60 of the present invention has assumed the position shown in FIG. 2, control housing 69 may be raised to the surface where it can be later utilized at the same, or another, location.

It is to be understood that the invention is not limited to the exact details of construction, operation, exact materials, or embodiments shown and described, as obvious modifications and equivalents will be apparent to one skilled in the art. For example, one or more of the resilient inserts, when compressed, could cause the contact of aligned electrical devices to create an electrical path for the transmission of electrical signals. Accordingly, the invention is therefore to be limited only by the scope of the appended claims.

I claim:

1. An underwater connector comprising:
   a hollow first body including at least one first conduit for the passage of a fluid therethrough and having an end thereof communicating with the interior of the first body;
   a second body which fits within the first body and includes at least one second conduit for the passage of a fluid therethrough and having an end thereof communicating with the exterior surface of the second body;
   at least one deformable sealing means mounted within an opening in the second body and disposed about the end of the second conduit, said sealing means being disposed in a first position spaced from the interior surface of the first body and aligned with the end of the first conduit in the first body, said sealing means comprising at least one resilient insert having an opening therethrough and encircling the end of the second conduit;
   compression means for selectively deforming the sealing means whereby the sealing means is forced outwardly to a second position in contact with the interior surface of the first body to provide a sealed passageway for the passage of fluid between said first and second conduits; and
   means for selectively actuating the compression means.

2. The underwater connector of claim 1, wherein the compression means is a bar member slidably mounted within the second body for selective longitudinal movement toward and away from the sealing means.

3. The underwater connector of claim 1 wherein the means for actuating the compression means includes a third body telescopically mounted within the second body and the compression means is secured to the third body, whereby upon relative longitudinal movement of the third body with respect to the second body, the compression means contacts and deforms the sealing means.

4. The underwater connector of claim 3, wherein relative movement of the third body with respect to the second body is controlled by a hydraulic piston and cylinder operatively associated with the second and third bodies, said cylinder containing a quantity of pressurized fluid and having a vent line associated with the cylinder whereby upon venting of the cylinder, the longitudinal movement of the third body with respect to the second body occurs.

5. The underwater connector of claim 1 wherein the means for actuating the compression means includes at least one force receiving and transmitting surface associated with the second body for receiving and transmitting external underwater pressure forces to the compression means.

6. The underwater connector of claim 3 further includes at least one force receiving and transmitting surface associated with each of the second and third bodies for receiving and transmitting external underwater pressure forces to the compression means.

7. The underwater connector of claim 3 wherein the compression means is at least one bar member secured to the third body and the sealing means is at least one resilient insert having an opening therethrough encircling the end of the second conduit, the sealing means being mounted within an opening in the second body, whereby upon relative longitudinal movement of the third body with respect to the second body, the bar member contacts and deforms the resilient insert and moves the resilient insert from its first spaced position to said second position.

8. The underwater connection of claim 7 further including at least one force receiving and transmitting surface associated with each of the second and third bodies for receiving and transmitting external underwater pressure forces to the compression means.

9. The underwater connector of claim 1 wherein the at least one resilient insert is flush mounted within the opening in the exterior surface of the second body when the insert is in its first spaced position from the interior surface of the first body.

* * * * *